(12) United States Patent
Patel et al.

(10) Patent No.: US 9,325,536 B2
(45) Date of Patent: Apr. 26, 2016

(54) ENHANCED RECEIVER EQUALIZATION

(71) Applicant: Dell Products, LP, Round Rock, TX (US)

(72) Inventors: Bhavesh G. Patel, Austin, TX (US); Bhyrav M. Mutnury, Round Rock, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 0 days.

(21) Appl. No.: 14/491,165

(22) Filed: Sep. 19, 2014

(65) Prior Publication Data

US 2016/0087816 A1    Mar. 24, 2016

(51) Int. Cl.
*H03H 7/40* (2006.01)
*H04L 25/03* (2006.01)

(52) U.S. Cl.
CPC .............................. *H04L 25/03019* (2013.01)

(58) Field of Classification Search
CPC .................... H04L 25/03038; H04L 25/03057; H03H 21/0012

USPC ........... 275/232, 229; 708/322, 323; 375/232, 375/229
See application file for complete search history.

(56) References Cited

U.S. PATENT DOCUMENTS

| | | | |
|---|---|---|---|
| 8,654,898 B2 | 2/2014 | Bereza et al. | |
| 2004/0013188 A1* | 1/2004 | Tonietto et al. | 375/229 |
| 2006/0182172 A1* | 8/2006 | Lin | 375/233 |
| 2010/0246657 A1 | 9/2010 | Ou | |
| 2012/0170638 A1* | 7/2012 | Chen | 375/232 |
| 2013/0301695 A1 | 11/2013 | Nishi | |
| 2014/0312953 A1* | 10/2014 | Song | 327/308 |

* cited by examiner

*Primary Examiner* — Khai Tran
(74) *Attorney, Agent, or Firm* — Larson Newman, LLP

(57) ABSTRACT

A receiver includes an analog-to-digital converter module configured to receive a test bit stream via a transmission channel and to provide a channel loss value of the transmission channel based on the test bit stream, a continuous time linear equalization module configured to receive a data bit stream via the transmission channel and to provide an equalized data bit stream based on an equalization setting, and a control module configured to set the equalization setting such that the CTLE module provides an equalization level to compensate for the channel loss value.

17 Claims, 4 Drawing Sheets

ENHANCED RECEIVER EQUALIZATION

FIELD OF THE DISCLOSURE

This disclosure generally relates to information handling systems, and more particularly relates to link receiver equalization in a high speed serial interface.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

As the speed of high speed serial interfaces increases, variations in circuit design, component manufacture, environmental conditions, and other factors make it increasingly difficult to ensure highly reliable data transmission. In particular, transmitter and receiver equalization mechanisms to compensate for channel loss are calibrated on a best-effort basis, where settings that result in a "good enough" compensation solution are quickly obtained, in favor of iterative processes that might yield a more optimal solution, but which require an inordinate amount of time for such link training. However, as speed increases, such best-effort processes are increasingly unable to produce settings that are indeed good enough.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
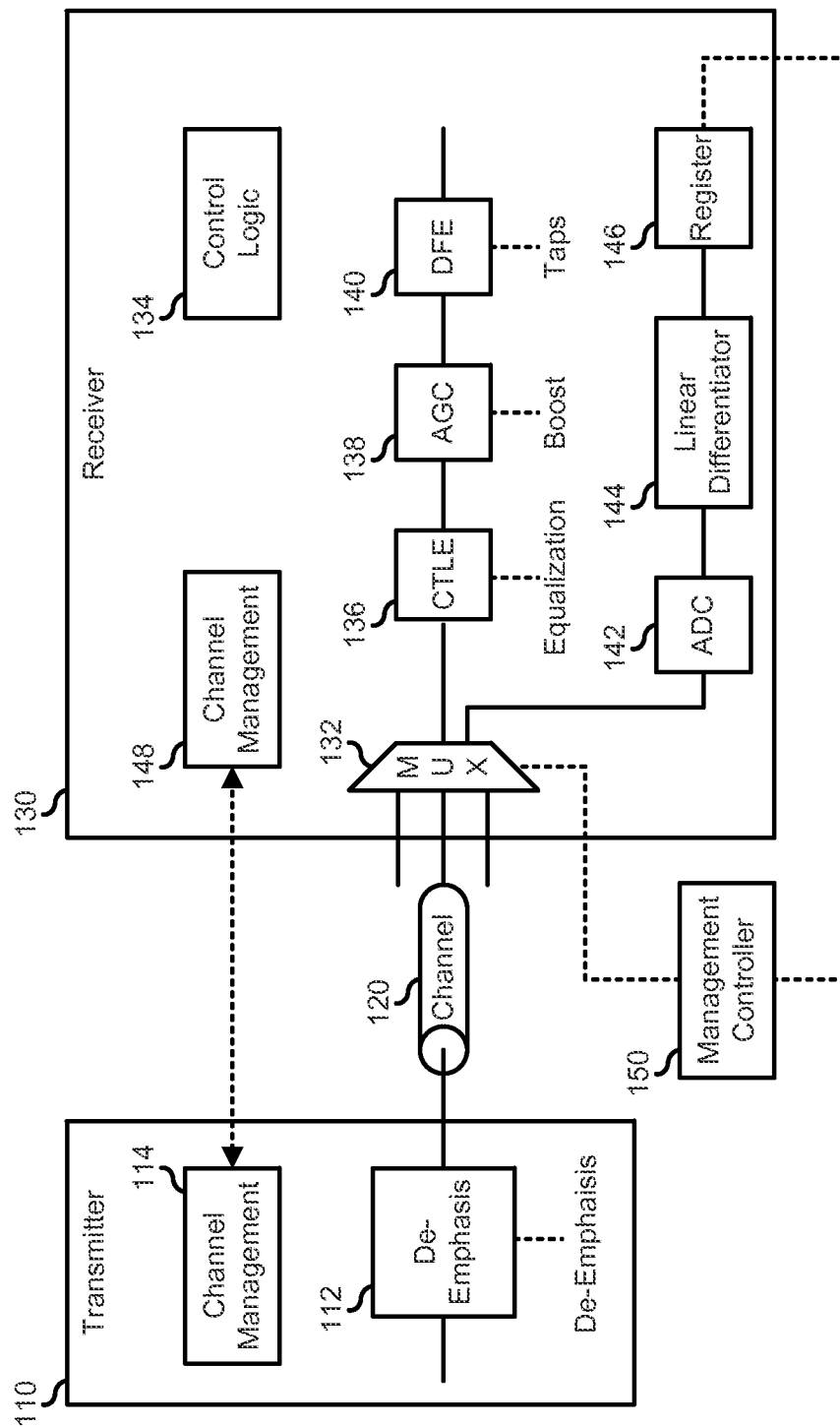
FIG. 1 illustrates an information handling system with a high speed serial interface according to an embodiment of the present disclosure.

FIG. 1 illustrates an embodiment of a high speed serial channel 100 of an information handling system. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Serial channel 100 includes a transmitter 110, a transmission channel 120, and a receiver 130. Serial channel 100 represents one half of a bi-directional serial data link for communicating data from transmitter 110 located at a first component to receiver 130 located at a second component. The other half of the bi-directional serial data link is similar to serial channel 100, but with a receiver in the first component, and a transmitter in the second component, for communicating data back from the second component to the first component. Here, the components can be understood to include elements within an information handling system, such as components that are attached to one or more printed circuit board of the information handling system, where transmission channel 120 can represent one or more circuit traces on the printed circuit board, and can include one or more connectors. The components can also be understood to include devices of an information handling system, such as a hard drive, a storage array, and the like, that are separate from the printed circuit board of the information handling system, where transmission channel 120 can include one or more transmission cables. An example of serial channel 100 includes a PCI-Express (PCIe) channel that is in compliance with one or more PCIe specification, up to, and including the PCIe 4.0 Specification, a Serial ATA (SATA) channel that is in compliance with one or more SATA specification, up to, and including the SATA 3.2 Specification, a SAS channel that is in compliance with one or more SAS specification, up to and including the Serial Attached SCSI 4.0 Standard, or another high speed serial channel.

Serial channel 100 operates to determine a characterize transmission channel 120 in terms of an insertion loss value that is experienced in the data signals that are transmitted from transmitter 110 to receiver 130, and to deterministically adjust various compensation values within the transmitter and the receiver to compensate for the insertion loss of the transmission channel. In particular, in a first mode, transmitter 110 sends a predetermined data pattern to receiver 130, and the receiver evaluates the received signal in order to characterize the insertion loss of transmission channel 120, and to determine an insertion loss value for the transmission channel. Then, in a second mode, receiver 130 sets various compensation values within the receiver to provide a compensation level that is equal to the insertion loss level. If the adjustments within receiver 130 are insufficient to fully compensate for the insertion loss of transmission channel 120, then the receiver directs transmitter 110 to set a de-emphasis value within the transmitter to further compensate for the insertion loss of the transmission channel. If the adjustments within transmitter 110 are still insufficient to fully compensate for the insertion loss, then receiver 130 sets additional compensation values within the receiver to provide a compensation level that is as close to the insertion loss level as is possible with the range of settings of the receiver and of transmitter 110.

Transmitter 110 includes a de-emphasis module 112 and a channel management module 114. In operation, serial data is provided to de-emphasis module 112, and the de-emphasis module operates to provide a reduction in the signal levels of the serial data after a first data bit is transmitted, in order to de-emphasize the subsequent data bits and to transmit the de-emphasized serial data to receiver 130 via transmission channel 120. The amount of de-emphasis is determined based upon a de-emphasis setting. For example, transmitter 110 can support 21 settings which each prescribe a different amount of de-emphasis, from 0 dB to 10 dB, in 0.5 dB steps. Other numbers of settings and amounts of de-emphasis prescribe by the settings can be utilized, as needed or desired. Channel management module 114 will be described below.

Receiver 130 includes a multiplexor 132, a control logic module 134, a continuous time linear equalization (CTLE) module 136, an automatic gain control (AGC) module 138, a decision feedback equalization (DFE) module 140, an analog-to-digital converter (ADC) module 142, a linear differentiator 144, a register 146, and a channel management module 148. In operation, the de-emphasized serial data is received by multiplexor 132. In the first mode, where transmitter 110 sends the predetermined data pattern to receiver 130, multiplexor 132 provides the received signal to ADC module 142, linear differentiator 144, and register 146 to characterize the insertion loss of transmission channel 120, and to determine an insertion loss value for the transmission channel. For example, transmitter 110 can provide a bit stream of 200 zeros followed by 1000 ones, thereby approximating the transmission of a step function on transmission channel 120, and ADC module 142 can provide a digital representation of the analog signal received by receiver 130. Linear differentiator 144 can analyze the digital representation of the response of transmission channel 120 to the step function, to determine the insertion loss level of the transmission channel. Register 146 stores the insertion loss level and provides the insertion loss level to management controller 150. Management controller 150 operates to coordinate the determination of insertion loss levels for multiple serial channels similar to serial channel 100. As such, multiplexor 132 operates to receive inputs from multiple transmission channels similar to transmission channel 120, and selectively routes the received signals to ADC module 142. In this way, a multi-channel device can include a single set of elements for determining the insertion loss levels of multiple transmission channels. In the second mode, multiplexor 132 provides the received signal to CTLE module 136, AGC module 138, and DFE module 140, and to set various compensation values within receiver 130 to provide a compensation level that is equal to the insertion loss level stored by register 146, as described further below.

In providing a compensation level that is equal to the insertion loss level, receiver 130 operates to deterministically ensure that the equalization provided by the receiver and transmitter 110 sum to equal the insertion loss level. That is:

$$\text{Loss} = \text{Eq}_{TX} + \text{Eq}_{CTLE} + \text{Eq}_{Boost} + \text{Eq}_{DFE} \qquad \text{Equation 1}$$

where Loss is the determined insertion loss level, $\text{Eq}_{TX}$ is the compensation from de-emphasis module 112 based on the de-emphasis setting, $\text{Eq}_{CTLE}$ is a compensation from CTLE module 136 based on a CTLE setting, $\text{Eq}_{Boost}$ is a compensation from AGC module 138 based on a boost setting, and $\text{Eq}_{DFE}$ is a compensation from DFE module 140 based on a number of taps that are inserted into the circuit of the DFE module. If all of the compensation measures in transmitter 110 and receiver 130 are inadequate to fully compensate the insertion loss level, then receiver 130 operates to deterministically ensure that the equalization provided by the receiver and transmitter 110 are at a maximum obtainable level to best compensate the insertion loss level.

In a particular embodiment, when serial channel 100 is in the second mode, then control logic module 134 evaluates the insertion loss level and determines an equalization setting for CTLE module 136 such that the compensation provided by the CTLE module is equal to the insertion loss level, and the channel training is done. If CTLE module 136 provides insufficient compensation to offset the insertion loss level, then the equalization setting for the CTLE module is set to provide the maximum compensation, and then control logic module 134 evaluates the difference of the insertion loss level and the maximum compensation provided by CTLE module 136, that is, the amount of uncompensated insertion loss after the equalization setting for the CTLE module is set to the maximum level, and determines a boost setting for AGC module 138 such that the compensation provided by the AGC module is equal to the uncompensated insertion loss level, and the channel training is done. If AGC module 138 provides insufficient compensation to offset the uncompensated insertion loss level, then the boost setting for the AGC module is set to provide the maximum compensation.

At this point, receiver 148 provides an indication to transmitter 110 of the amount of insertion loss that remains uncompensated by CTLE module 134 and by AGC module 138. The indication is provided from channel management module 148 to channel management module 114. In a particular embodiment, channel management modules 114 and 148 communicate via an out-of-band communication channel, such as a SATA OOB communication channel. In another embodiment, channel management modules 114 and 148 communicate via an in-of-band communication channel, such as via management data communicated over transmission channel 120 and the serial link counterpart transmission channel from receiver 130 to transmitter 110. In response to receiving the indication, transmitter 110 evaluates the amount of insertion loss that remains uncompensated by receiver 130 and determines a de-emphasis setting for de-emphasis module 112 to offset the amount of the insertion loss level that remains uncompensated by the receiver, and the channel training is done. Transmitter 110 will then provide an indication to control logic module 134 that the channel training is done. If de-emphasis module 112 provides insufficient compensation to offset the uncompensated insertion loss level, then the de-emphasis setting for the de-emphasis module is set to provide the maximum compensation, and transmitter 110 provides an indication to control logic module 134 of the amount of insertion loss that remains uncompensated by de-emphasis module 112. Control logic module 134 receives the indication and sets the taps setting to turn on the maximum number of taps of DFE module 140, and the channel training is done.

The order in which the compensation from de-emphasis module 112, CTLE module 136, AGC module 138, and DFE module 140 can be changed as needed or desired. Here, the aim is to select a compensation mechanism and set it to compensate for the insertion loss level to the degree necessary to either totally compensate, or to maximize the compensation from that mechanism, before turning to another compensation mechanism. Note that the methods described herein is deterministic in that, by the method described above, the insertion loss level for transmission channel 120 is known in real time on the actual transmission channel, rather than based upon design assumptions or best practices, and in that the amount of compensation that is needed to compensate for the insertion loss is therefore a known quantity, so that known values of compensation from the various compensation mechanisms can be added to precisely match the insertion loss.

Note that a transmitter similar to transmitter 110 can include additional compensation mechanisms that can be utilized in the methods described herein. Further, the methods described herein are likewise applicable when a transmitter 110 does not include any compensation mechanisms, or is unable to communicate with receiver 130, because except in cases of very large insertion loss values, the receiver may be able to provide sufficient compensation to completely compensate for the insertion loss value. Similarly, a receiver similar to receiver 130 can include more or less compensation mechanisms, as needed or desired.

Figure 2:
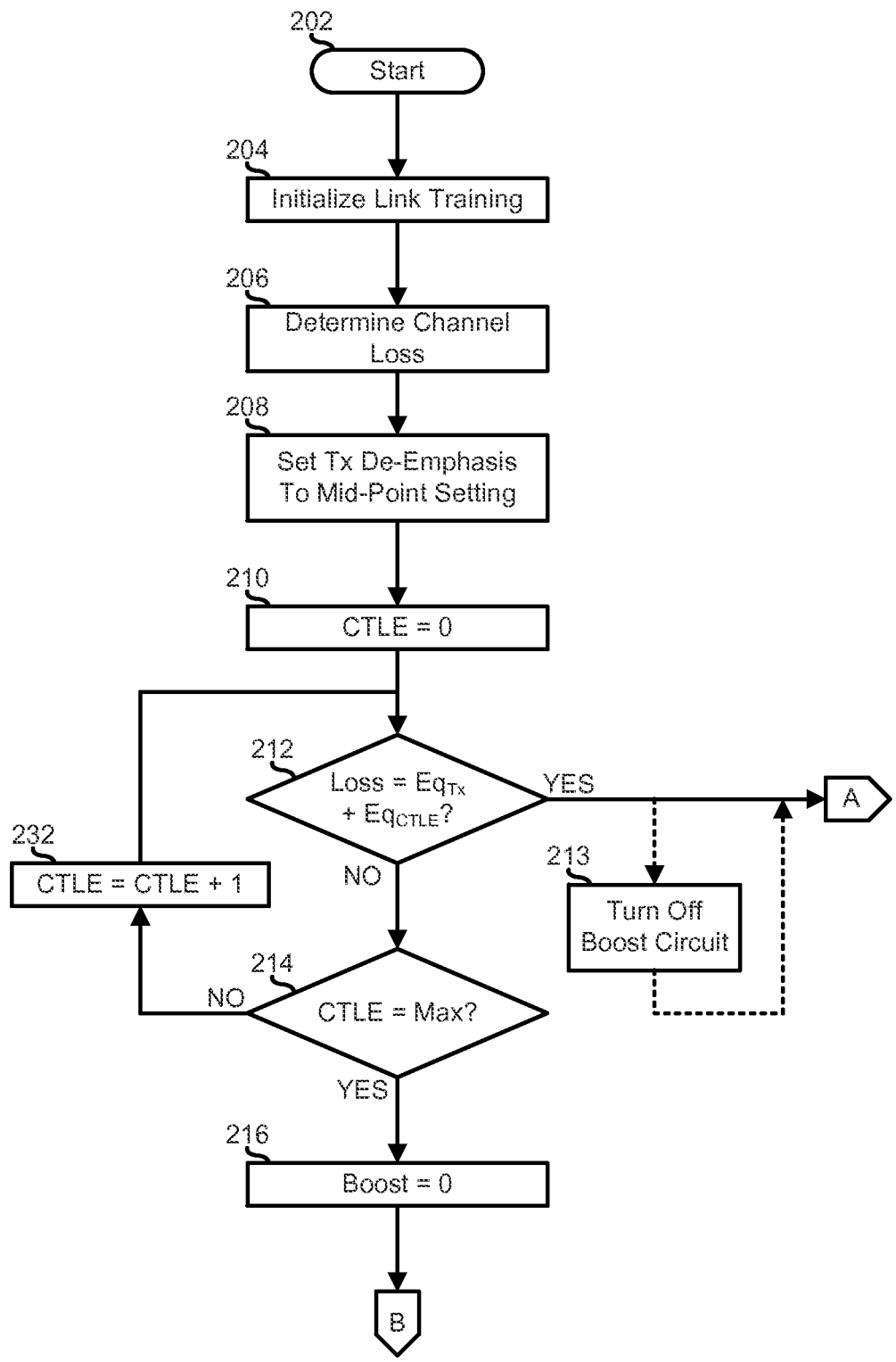
FIGS. 2 and 3 are flowcharts illustrating a method of link receiver equalization in a high speed serial interface according to an embodiment of the present disclosure.
Figure 3:
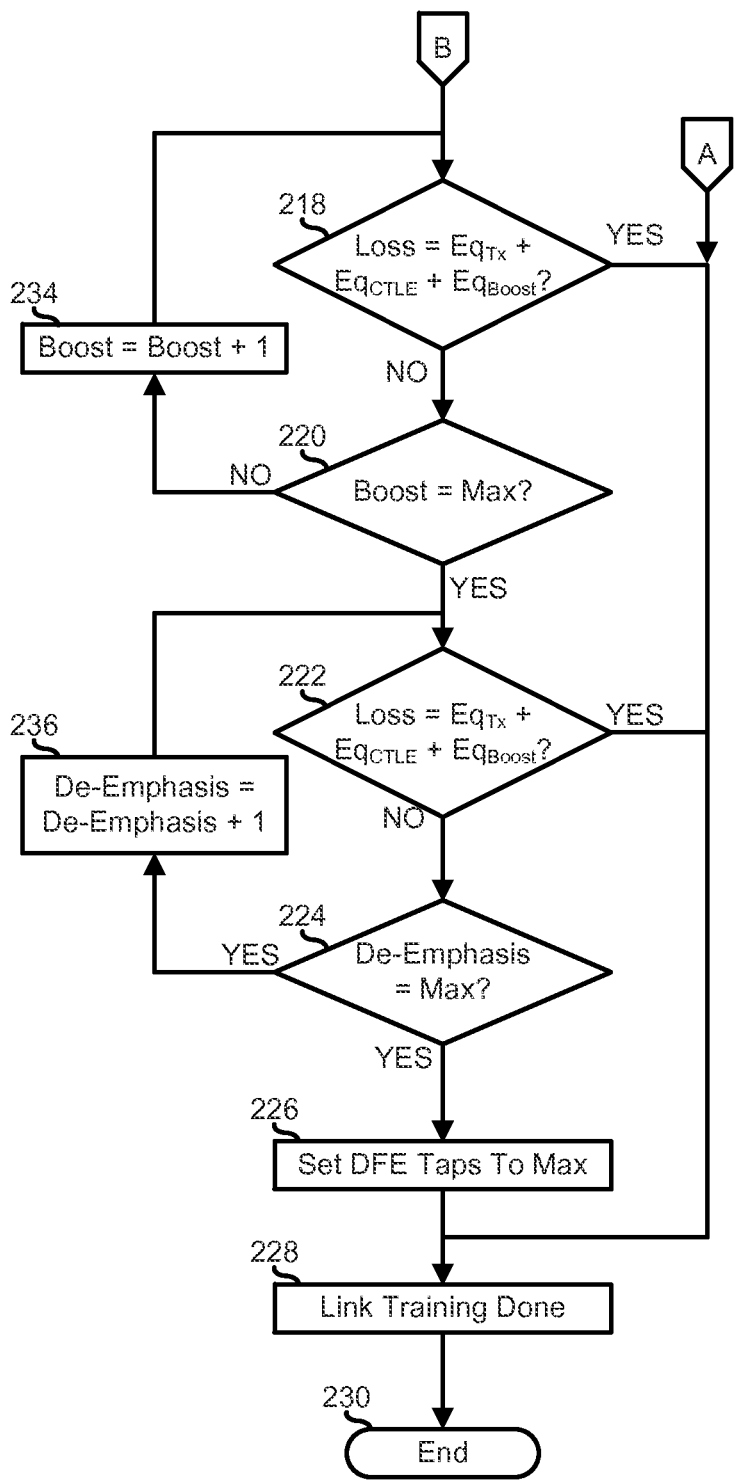

FIGS. 2 and 3 illustrate a method of link receiver equalization in a high speed serial interface, starting at block 202. Link training of a high speed serial link is initialized in block 204. For example, a single transmitter/receiver pair, such as transmitter 110 and receiver 130, of a bi-directional link can begin link training over transmission channel 120. The channel insertion loss of the transmission channel of the high speed serial link is determined in block 206. For example, the pre-determined data pattern can be provided by transmitter 110 to receiver 130, ADC module 142 can provide a digital representation of the analog signal, linear differentiator 144 can analyze the digital representation of the response of transmission channel 120 to the step function, to determine the insertion loss level of the transmission channel, and register 146 can store the insertion loss level.

De-emphasis in the transmitter is set to a midpoint setting in block 208. Here, the de-emphasis setting of de-emphasis module 112 can be set such that the de-emphasis module provided a de-emphasis compensation that is in the middle of the range of de-emphasis values provided by the de-emphasis module. CTLE in the receiver is set to the lowest level of compensation, that is, to a zero value, in block 210. For example, the CTLE setting of CTLE module 136 can be set such that the CTLE module provides a minimum amount of CTLE compensation. A decision is made as to whether or not the sum of the amount of compensation provided by setting the transmitter de-emphasis to the midpoint and the amount of compensation provided by the current setting of the CTLE in the receiver is equal to the insertion loss value in decision block 212. If so, the "YES" branch of decision block 212 is taken, the link training is finished in block 228, and the method ends in block 230.

If the sum of the amount of compensation provided by setting the transmitter de-emphasis to the midpoint and the amount of compensation provided by the current setting of the CTLE in the receiver is not equal to the insertion loss value, the "NO" branch of decision block 212 is taken and a decision is made as to whether or not the CTLE compensation is at a maximum level in decision block 214. If not, the "NO" branch of decision block 214 is taken, the CTLE setting is set to provide a next higher level of compensation in block 232, and the method returns to decision block 212 where the decision is made as to whether or not the sum of the amount of compensation provided by setting the transmitter de-emphasis to the midpoint and the amount of compensation provided by the new setting of the CTLE in the receiver is equal to the insertion loss value. If the CTLE compensation is at a maximum level, the "YES" branch of decision block 214 is taken and boost in the receiver is set to the lowest level of compensation, that is, to a zero value, in block 216. For example, the AGC setting of AGC module 138 can be set such that the AGE module provides a minimum amount of boost. A decision is made as to whether or not the sum of the amount of the previously provided compensation provided by the transmitter de-emphasis and by the receiver CTLE compensation, and the amount of compensation provided by the current setting of the boost in the receiver is equal to the insertion loss value in decision block 218. If so, the "YES" branch of decision block 218 is taken, the link training is finished in block 228, and the method ends in block 230.

If the sum of the amount of the previously provided compensation provided by the transmitter de-emphasis and by the receiver CTLE compensation, and the amount of compensation provided by the current setting of the boost in the receiver is not equal to the insertion loss value, the "NO" branch of decision block 218 is taken and a decision is made as to whether or not the boost is at a maximum level in decision block 220. If not, the "NO" branch of decision block 220 is taken, the boost setting is set to provide a next higher level of compensation in block 234, and the method returns to decision block 218 where the decision is made as to whether or not the sum of the amount of the previously provided compensation provided by the transmitter de-emphasis and by the receiver CTLE compensation, and the amount of compensation provided by the new setting of the boost in the receiver is equal to the insertion loss value. If the boost is at a maximum level, the "YES" branch of decision block 220 is taken, and a decision is made as to whether or not the sum of the amount of the previously provided compensation provided by the transmitter de-emphasis, by the receiver CTLE compensation, and by the receiver boost is equal to the insertion loss value in decision block 222. If so, the "YES" branch of decision block 222 is taken, the link training is finished in block 228, and the method ends in block 230.

If the sum of the amount of the previously provided compensation provided by the transmitter de-emphasis, by the receiver CTLE compensation, and by the receiver boost is not equal to the insertion loss value, the "NO" branch of decision block 222 is taken and a decision is made as to whether or not the transmitter de-emphasis is at a maximum level in decision block 224. If not, the "NO" branch of decision block 224 is taken, the de-emphasis setting is set to provide a next higher level of compensation in block 236, and the method returns to decision block 222 where the decision is made as to whether or not the sum of the amount of the previously provided compensation provided by the transmitter de-emphasis, by the receiver CTLE compensation, by the receiver boost, and by the newly added transmitter de-emphasis compensation is not equal to the insertion loss value. If the transmitter de-emphasis compensation is at a maximum level, the "YES" branch of decision block 224 is taken, a number of taps selected by a taps setting for a DFE compensation mechanism is set to its maximum value in block 226, the link training is finished in block 228, and the method ends in block 230.

In another embodiment of the method of FIGS. 2 and 3, the loops illustrated in blocks 212, 214, and 232, blocks 218, 220, and 234, and blocks 222, 224, and 236 are not performed iteratively, but rather, the amount of compensation available in each compensation mechanism is compared with the insertion loss value, and the setting for each compensation mechanism is directly set, either to the amount of compensation that equalizes the insertion loss, or to its maximum value, as needed, and then the next compensation mechanism is processed similarly. In another embodiment, the method of FIGS. 2 and 3 is performed periodically in order to ensure optimal performance in the serial channel, for example to compensate for drift or for thermal variations in the performance of the channel.

Figure 4:
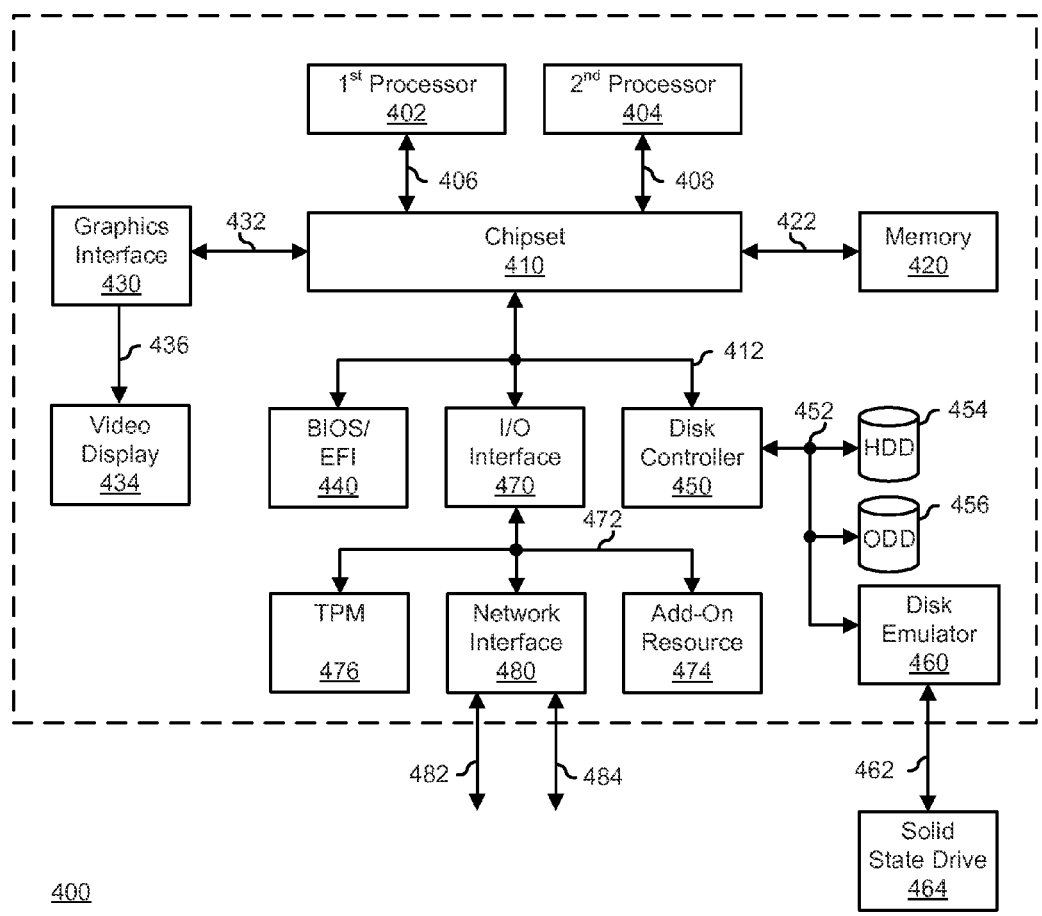
FIG. 4 is a block diagram illustrating a generalized information handling system according to an embodiment of the present disclosure.

FIG. 4 illustrates a generalized embodiment of information handling system 400. For purpose of this disclosure information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described above, and operates to perform one or more of the methods described above. Information handling system 400 includes a processors 402 and 404, a chipset 410, a memory 420, a graphics interface 430, include a basic input and output system/extensible firmware interface (BIOS/EFI) module 440, a disk controller 450, a disk emulator 460, an input/output (I/O) interface 470, and a network interface 480. Processor 402 is connected to chipset 410 via processor interface 406, and processor 404 is connected to the chipset via processor interface 408. Memory 420 is connected to chipset 410 via a memory bus 422. Graphics interface 430 is connected to chipset 410 via a graphics interface 432, and provides a video display output 436 to a video display 434. In a particular embodiment, information handling system 400 includes separate memories that are dedicated to each of processors 402 and 404 via separate memory interfaces. An example of memory 420 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 440, disk controller 450, and I/O interface 470 are connected to chipset 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 440 includes BIOS/EFI code operable to detect resources within information handling system 400, to provide drivers for the resources, initialize the resources, and access the resources. BIOS/EFI module 440 includes code that operates to detect resources within information handling system 400, to provide drivers for the resources, to initialize the resources, and to access the resources.

Disk controller 450 includes a disk interface 452 that connects the disc controller to a hard disk drive (HDD) 454, to an optical disk drive (ODD) 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits a solid-state drive 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O interface 470 includes a peripheral interface 472 that connects the I/O interface to an add-on resource 474, to a TPM 476, and to network interface 480. Peripheral interface 472 can be the same type of interface as I/O channel 412, or can be a different type of interface. As such, I/O interface 470 extends the capacity of I/O channel 412 when peripheral interface 472 and the I/O channel are of the same type, and the I/O interface translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as chipset 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A receiver, comprising:
   an analog-to-digital converter (ADC) module configured to receive a test bit stream via a transmission channel and to provide a channel loss value of the transmission channel based on the test bit stream;
   a continuous time linear equalization (CTLE) module configured to:
      receive a data bit stream via the transmission channel; and
      provide an equalized data bit stream based on an equalization setting;
   a control module configured to set the equalization setting such that the CTLE module provides an equalization level to compensate for the channel loss value;
   wherein:
      the ADC module is further configured to receive a second test bit stream via the transmission channel and to provide a second channel loss value of the transmission channel based on the second test bit stream; and
      the control module is further configured to reset the equalization setting such that the CTLE module provides a second equalization level to compensate for the second channel loss value.

2. The receiver of claim 1, further comprising:
   an automatic gain control (AGC) module coupled to the CTLE module and configured to:
      receive the equalized data bit stream; and
      provide a boosted data bit stream based on a boost setting;
   wherein the control module is further configured to:
      determine that a maximum equalization level of the CTLE module is less than the channel loss value;
      set the equalization setting such that the CTLE module provides the maximum equalization level; and
      set a boost setting such that the AGC module provides a boost level to further compensate for the channel loss value.

3. The receiver of claim 2, further comprising:
   a channel management module configured to communicate with a transmitter, wherein the transmitter is configured to provide the test bit stream and the data bit stream;
   wherein the control module is further configured to:
      determine that a sum of the maximum equalization level and a maximum boost level of the AGC module is less than the channel loss value;
      set the boost setting such that the AGC module provides the maximum boost level; and
      direct, via the channel management module, the transmitter to set a de-emphasis setting of the transmitter such that the transmitter provides a de-emphasis level to further compensate for the channel loss value.

4. The receiver of claim 3, further comprising:
   a decision feedback equalization (DFE) module including a plurality of taps;
   wherein the control module is further configured to:
      determine that a sum of the maximum equalization level, a maximum boost level, and a maximum de-emphasis value of the transmitter is less than the channel loss value; and
      set the DFE module to enable all of he plurality of taps.

5. The receiver of claim 1, wherein receiving the test bit stream is in response to a channel training of the channel receiver.

6. The receiver of claim 1, wherein the channel receiver comprises one of a PCI-Express channel, a Serial ATA channel, a Serial Attached SCSI channel, and a Fibre Channel channel.

7. A method comprising:
   receiving, at an analog-to-digital converter (ADC) module of a receiver, a test bit stream via a transmission channel coupled to the receiver;
   providing, by the ADC module, a channel loss value of the transmission channel based on the test bit stream;
   receiving, by the receiver, a data bit stream vie the transmission channel;
   setting, by a continuous time linear equalization (CTLE) module, an equalization setting such that the CTLE module provides an equalization level to the data bit stream to compensate for the channel loss value;
   receiving, by an automatic gain control (AGC) module of the receiver and coupled to the CTLE module, the equalized data bit stream;
   determining that a maximum equalization level of the CTLE module is less than the channel loss value;
   setting the equalization setting such that the CTLE module provides the maximum equalization level; and
   setting a boost setting such that the AGC module provides a boost level to further compensate for the channel loss value.

8. The method of claim 7, further comprising:
   determining that a sum of the maximum equalization level and a maximum boost level of the AGC module is less than the channel loss value;
   setting the boost setting such that the AGC module provides the maximum boost level; and
   directing, via a channel management module of the receiver, a transmitter coupled to the transmission channel to set a de-emphasis setting of the transmitter such that the transmitter provides a de-emphasis level to further compensate for the channel loss value.

9. The method of claim 8, further comprising:
determining that a sum of the maximum equalization level, a maximum boost level, and a maximum de-emphasis value of the transmitter is less than the channel loss value; and
setting a decision feedback equalization (DFE) module including a plurality of taps to enable all of he plurality of taps.

10. The method of claim 9, further comprising:
receiving, by the ADC module, a second test bit stream via the transmission channel;
providing a second channel loss value of the transmission channel based on the second test bit stream; and
resetting the equalization setting such that the CTLE module provides a second equalization level to compensate for the second channel loss value.

11. The method of claim 7, wherein receiving the test bit stream is in response to a channel training of the channel receiver.

12. The method of claim 7, wherein the channel receiver comprises one of a PCI-Express channel, a Serial ATA channel, a Serial Attached SCSI channel, and a Fibre Channel channel.

13. A non-transitory computer-readable medium including code for performing a method, the method comprising:
receiving, at an analog-to-digital converter (ADC) module of a receiver, a test bit stream via a transmission channel coupled to the receiver;
providing, by the ADC module, a channel loss value of the transmission channel based on the test bit stream;
receiving, by the receiver, a data bit stream vie the transmission channel;
setting, by a continuous time linear equalization (CTLE) module, an equalization setting such that the CTLE module provides an equalization level to the data bit stream to compensate for the channel loss value;
receiving, by an automatic gain control (AGC) module of the receiver and coupled to the CTLE module, the equalized data bit stream;
determining that a maximum equalization level of the CTLE module is less than the channel loss value;
setting the equalization setting such that the CTLE module provides the maximum equalization level; and
setting a boost setting such that the AGC module provides a boost level to further compensate for the channel loss value.

14. The computer-readable medium of claim 13, the method further comprising:
determining that a sum of the maximum equalization level and a maximum boost level of the AGC module is less than the channel loss value;
setting the boost setting such that the AGC module provides the maximum boost level; and
directing, via a channel management module of the receiver, a transmitter coupled to the transmission channel to set a de-emphasis setting of the transmitter such that the transmitter provides a de-emphasis level to further compensate for the channel loss value.

15. The computer-readable medium of claim 14, the method further comprising:
determining that a sum of the maximum equalization level, a maximum boost level, and a maximum de-emphasis value of the transmitter is less than the channel loss value; and
setting a decision feedback equalization (DFE) module including a plurality of taps to enable all of he plurality of taps.

16. The computer-readable medium of claim 15, the method further comprising
receiving, by the ADC module, a second test bit stream via the transmission channel;
providing a second channel loss value of the transmission channel based on the second test bit stream; and
resetting the equalization setting such that the CTLE module provides a second equalization level to compensate for the second channel loss value.

17. The computer-readable medium of claim 13, wherein receiving the test bit stream is in response to a channel training of the channel receiver.

* * * * *

UNITED STATES PATENT AND TRADEMARK OFFICE
CERTIFICATE OF CORRECTION

PATENT NO.         : 9,325,536 B2
APPLICATION NO.    : 14/491165
DATED              : April 26, 2016
INVENTOR(S)        : Bhavesh G. Patel et al.

Page 1 of 1

It is certified that error appears in the above-identified patent and that said Letters Patent is hereby corrected as shown below:

In the claims,

Col. 10, Line 29, Claim 4, change "set the DFE module to enable all of he plurality of taps." to --set the DFE module to enable all of the plurality of taps--

Col. 11, Lines 8-10, Claim 9, change "setting a decision feedback equalization (DFE) module including a plurality of taps to enable all of he plurality of taps." to --setting a decision feedback equalization (DFE) module including a plurality of taps to enable all of the plurality of taps.--

Col. 12, Lines 26-28, Claim 15, change "setting a decision feedback equalization (DFE) module including a plurality of taps to enable all of he plurality of taps." to --setting a decision feedback equalization (DFE) module including a plurality of taps to enable all of the plurality of taps.--

Signed and Sealed this
Nineteenth Day of July, 2016

Michelle K. Lee
*Director of the United States Patent and Trademark Office*